(12) United States Patent
Carey et al.

(10) Patent No.: US 10,834,156 B2
(45) Date of Patent: Nov. 10, 2020

(54) SYSTEM AND METHOD FOR DEFINING WINDOWS OF TUPLES OF INTEREST

(71) Applicant: International Business Machines Corporation, Armonk, NY (US)

(72) Inventors: James Carey, Rochester, MN (US); Alexander Cook, Chaska, MN (US); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 15/845,140

(22) Filed: Dec. 18, 2017

(65) Prior Publication Data

US 2019/0190972 A1   Jun. 20, 2019

(51) Int. Cl.
  *G06F 9/00*   (2006.01)
  *G06F 16/00*  (2019.01)
  *H04L 29/06*  (2006.01)

(52) U.S. Cl.
  CPC ............... *H04L 65/60* (2013.01); *G06F 9/00* (2013.01); *G06F 16/00* (2019.01); *H04L 65/4069* (2013.01)

(58) Field of Classification Search
  CPC ..... H04L 65/60; H04L 65/4069; G06F 16/00; G06F 9/00
  See application file for complete search history.

(56) References Cited

U.S. PATENT DOCUMENTS

| | | |
|---|---|---|
| 8,924,940 B2 | 12/2014 | Branson et al. |
| 9,344,342 B2* | 5/2016 | Branson ............... H04L 43/026 |
| 9,438,656 B2 | 9/2016 | Branson et al. |
| 2011/0016160 A1* | 1/2011 | Zhang ..................... G06F 16/24 707/805 |
| 2015/0088889 A1 | 3/2015 | Branson et al. |
| 2016/0283554 A1* | 9/2016 | Ray ...................... G06F 16/2456 |

* cited by examiner

*Primary Examiner* — Viet D Vu
(74) *Attorney, Agent, or Firm* — Robert C. Bunker

(57) ABSTRACT

A method, computer program product, and computing device for identifying at least one tuple of interest from a plurality of tuples during execution of a streaming application. A window of tuples including the at least one tuple from the plurality of tuples may be defined. One or more operations may be performed on the window of tuples.

17 Claims, 5 Drawing Sheets

SYSTEM AND METHOD FOR DEFINING WINDOWS OF TUPLES OF INTEREST

BACKGROUND

Stream computing is a component of the Big Data paradigm where high volumes of data, both structured and unstructured, are processed in near real time. Generally, data enters a streaming application as tuples from some source (e.g., tcp, udp, Apache KAFKA®, MQSeries®, even files) and stream operators process the tuples as they arrive. Stream operators may do various functions, such as filter operations, aggregate operations, splitting operations, etc. In some situations, problems may arise based upon all data processed by a streaming application being treated the same. It is up to the developer to create carefully crafted operators to process data. However, it may be observed over time that there are patterns in tuples that have a tendency to be of more interest than other tuples. Sometime these "tuples of interest" may wreak havoc on a streaming application because they process too slow or even too fast. These anomalies may make debugging a streaming application problematic. Furthermore, there are times when a streaming application developer and/or a streaming application user would like to observe groups or windows of these tuples of interest.

BRIEF SUMMARY OF DISCLOSURE

In one example implementation, a computer-implemented method is executed on a computing device and may include but is not limited to identifying at least one tuple of interest from a plurality of tuples during execution of a streaming application. A window of tuples including the at least one tuple from the plurality of tuples may be defined. One or more operations may be performed on the window of tuples.

One or more of the following example features may be included. Identifying the at least one tuple of interest may include identifying the at least one tuple of interest based upon, at least in part, one or more of a relative processing time associated with each of the plurality of tuples, a relative value associated with each of the plurality of tuples, and a stream operator state associated with processing each of the plurality of tuples. Defining the window of tuples including the at least one tuple of interest may include identifying one or more tuples spatially adjacent to the at least one tuple of interest based upon, at least in part, a spatial adjacency threshold and defining the window of tuples to include the identified one or more tuples spatially adjacent to the at least one tuple of interest. Defining the window of tuples including the at least one tuple of interest may include identifying one or more tuples temporally adjacent to the at least one tuple of interest based upon, at least in part, a temporal adjacency threshold and defining the window of tuples to include the identified one or more tuples temporally adjacent to the at least one tuple of interest. Performing the one or more operations on the window of tuples may include communicating the window of tuples as a batch to one or more stream operators in the streaming application. Performing the one or more operations on the window of tuples may include modifying at least a portion of the tuples defined in the window of tuples based upon, at least in part, the at least one tuple of interest. Performing the one or more operations on the window of tuples may include adjusting the streaming application based upon, at least in part, the identified tuple of interest.

In another example implementation, a computer program product resides on a non-transitory computer readable medium that has a plurality of instructions stored on it. When executed across one or more processors, the plurality of instructions cause at least a portion of the one or more processors to perform operations that may include but are not limited to identifying at least one tuple of interest from a plurality of tuples during execution of a streaming application. A window of tuples including the at least one tuple from the plurality of tuples may be defined. One or more operations may be performed on the window of tuples.

One or more of the following example features may be included. Identifying the at least one tuple of interest may include identifying the at least one tuple of interest based upon, at least in part, one or more of a relative processing time associated with each of the plurality of tuples, a relative value associated with each of the plurality of tuples, and a stream operator state associated with processing each of the plurality of tuples. Defining the window of tuples including the at least one tuple of interest may include identifying one or more tuples spatially adjacent to the at least one tuple of interest based upon, at least in part, a spatial adjacency threshold and defining the window of tuples to include the identified one or more tuples spatially adjacent to the at least one tuple of interest. Defining the window of tuples including the at least one tuple of interest may include identifying one or more tuples temporally adjacent to the at least one tuple of interest based upon, at least in part, a temporal adjacency threshold and defining the window of tuples to include the identified one or more tuples temporally adjacent to the at least one tuple of interest. Performing the one or more operations on the window of tuples may include communicating the window of tuples as a batch to one or more stream operators in the streaming application. Performing the one or more operations on the window of tuples may include modifying at least a portion of the tuples defined in the window of tuples based upon, at least in part, the at least one tuple of interest. Performing the one or more operations on the window of tuples may include adjusting the streaming application based upon, at least in part, the identified tuple of interest.

In another example implementation, a computing system may include one or more processors and one or more memories, wherein the computing system is configured to perform operations that may include but are not limited to identifying at least one tuple of interest from a plurality of tuples during execution of a streaming application. A window of tuples including the at least one tuple from the plurality of tuples may be defined. One or more operations may be performed on the window of tuples.

One or more of the following example features may be included. Identifying the at least one tuple of interest may include identifying the at least one tuple of interest based upon, at least in part, one or more of a relative processing time associated with each of the plurality of tuples, a relative value associated with each of the plurality of tuples, and a stream operator state associated with processing each of the plurality of tuples. Defining the window of tuples including the at least one tuple of interest may include identifying one or more tuples spatially adjacent to the at least one tuple of interest based upon, at least in part, a spatial adjacency threshold and defining the window of tuples to include the identified one or more tuples spatially adjacent to the at least one tuple of interest. Defining the window of tuples including the at least one tuple of interest may include identifying one or more tuples temporally adjacent to the at least one tuple of interest based upon, at least in part, a temporal adjacency threshold and defining the window of tuples to include the identified one or more tuples temporally adjacent to the at least one tuple of interest. Performing the one or more operations on the window of tuples may include communicating the window of tuples as a batch to one or more stream operators in the streaming application. Performing the one or more operations on the window of tuples may include modifying at least a portion of the tuples defined in the window of tuples based upon, at least in part, the at least one tuple of interest. Performing the one or more operations on the window of tuples may include adjusting the streaming application based upon, at least in part, the identified tuple of interest.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

Like reference symbols in the various drawings indicate like elements.

DETAILED DESCRIPTION

Figure 1:
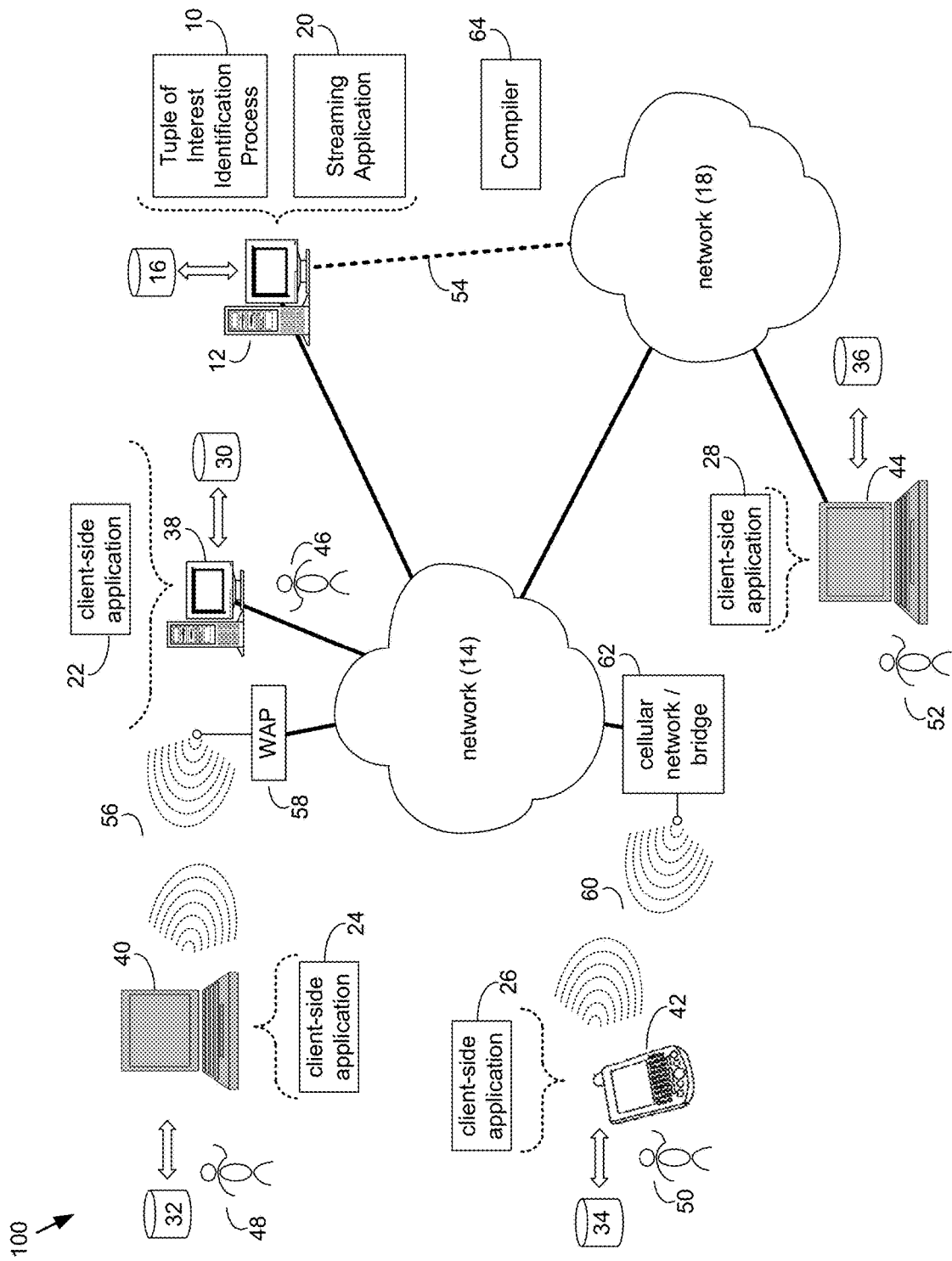
FIG. 1 is an example diagrammatic view of tuple of interest identification process coupled to a distributed computing network according to one or more example implementations of the disclosure.
Figure 2:
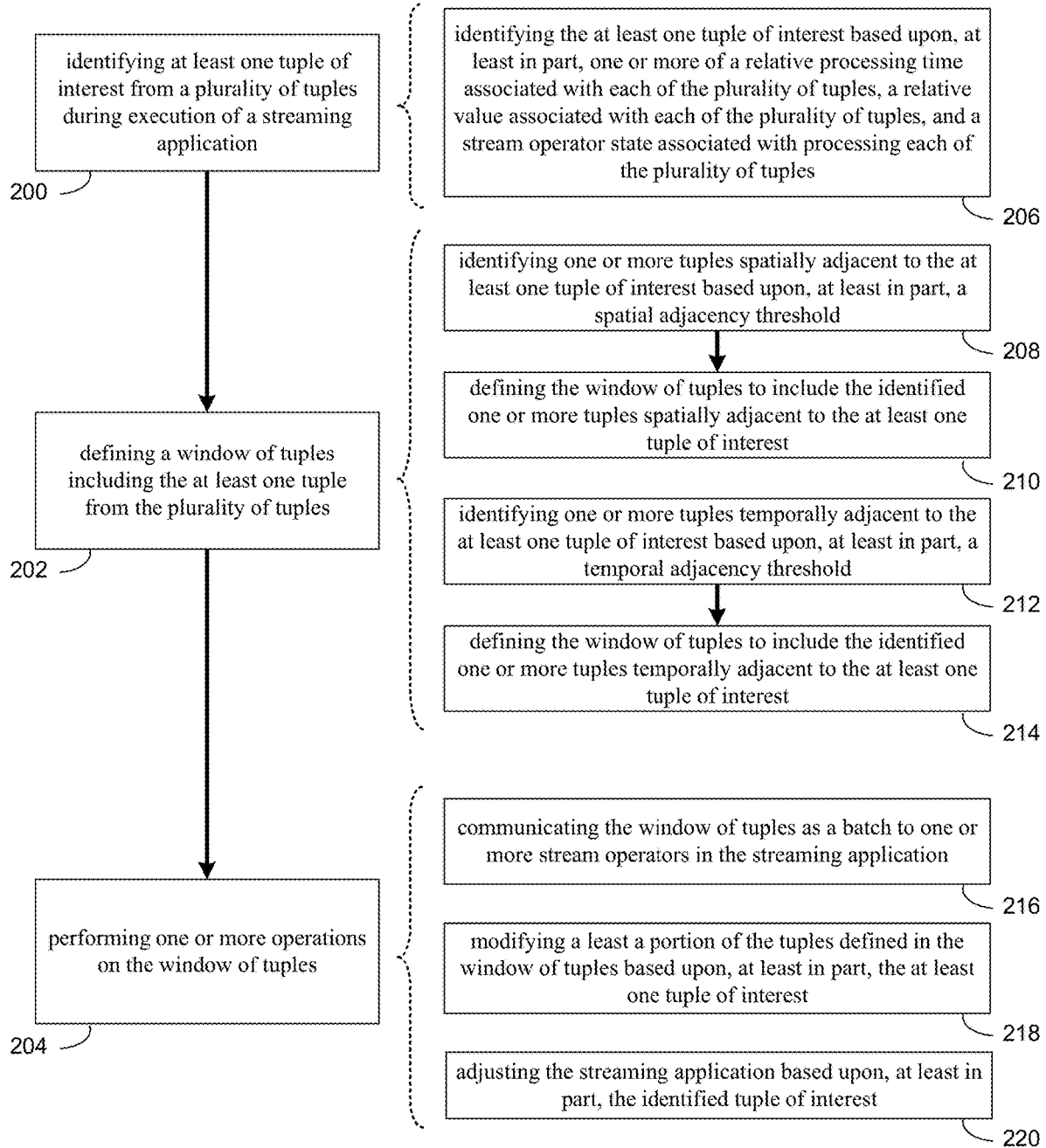
FIG. 2 is an example flowchart of the tuple of interest identification process of FIG. 1 according to one or more example implementations of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown tuple of interest identification process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, an tuple of interest identification process, such as tuple of interest identification process 10 of FIG. 1, may identify at least one tuple of interest from a plurality of tuples during execution of a streaming application. A window of tuples including the at least one tuple from the plurality of tuples may be defined. One or more operations may be performed on the window of tuples.

The instruction sets and subroutines of tuple of interest identification process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Tuple of interest identification process 10 may be a stand-alone application that interfaces with an applet/application that is accessed via client applications 22, 24, 26, 28, 66. In some embodiments, tuple of interest identification process 10 may be, in whole or in part, distributed in a cloud computing topology. In this way, computing device 12 and storage device 16 may refer to multiple devices, which may also be distributed throughout network 14 and/or network 18.

Computing device 12 may execute a streaming application (e.g., streaming application 20), examples of which may include, but are not limited to, e.g., IBM® Streams®, Apache® Storm™ Software, TIBCO Streambase®, or other application that allows for the analysis and correlation of information from data stream sources. (IBM and Streams are registered trademarks of International Business Machines Corporation in the United States, other countries or both; Apache is a registered trademark of Apache Software Foundation (ASF) in the United States, other countries or both; Storm is an unregistered trademark of Apache Software Foundation in the United States, other countries, or both; TIBCO and Streambase are registered trademarks of TIBCO Software Inc. in the United States, other countries or both). Streaming application 20 may also be referred to as a stream computing application and/or a stream processing application. Tuple of interest identification process 10 and/or streaming application 20 may be accessed via client applications 22, 24, 26, 28. For example, client electronic devices 38, 40, 42, 44 may create, implement, upload, and/or modify a streaming application on server 12 via client applications 22, 24, 26, 28. Tuple of interest identification process 10 may be a stand-alone application, or may be an applet/application/script/extension that may interact with and/or be executed within streaming application 20, a component of streaming application 20, and/or one or more of client applications 22, 24, 26, 28. Streaming application 20 may be a stand-alone application, or may be an applet/application/script/extension that may interact with and/or be executed within tuple of interest identification process 10, a component of tuple of interest identification process 10, and/or one or more of client applications 22, 24, 26, 28. One or more of client applications 22, 24, 26, 28 may be a stand-alone application, or may be an applet/application/script/extension that may interact with and/or be executed within and/or be a component of tuple of interest identification process 10 and/or streaming application 20. Examples of client applications 22, 24, 26, 28 may include, but are not limited to, e.g., IBM Streams, or other application that allows for the analysis and correlation of information from data stream sources, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of tuple of interest identification process 10 (and vice versa). Accordingly, tuple of interest identification process 10 may be a purely server-side application, a purely client-side application, or a hybrid server-side/client-side application that is cooperatively executed by one or more of client applications 22, 24, 26, 28, 66 and/or tuple of interest identification process 10.

One or more of client applications 22, 24, 26, 28, may be configured to effectuate some or all of the functionality of streaming application 20 (and vice versa). Accordingly, streaming application 20 may be a purely server-side application, a purely client-side application, or a hybrid server-side/client-side application that is cooperatively executed by one or more of client applications 22, 24, 26, 28 and/or streaming application 20. As one or more of client applications 22, 24, 26, 28, tuple of interest identification process 10, and streaming application 20, taken singly or in any combination, may effectuate some or all of the same functionality, any description of effectuating such functionality via one or more of client applications 22, 24, 26, 28, tuple of interest identification process 10, streaming application 20, or combination thereof, and any described interaction(s) between one or more of client applications 22, 24, 26, 28, tuple of interest identification process 10, streaming application 20, or combination thereof to effectuate such functionality, should be taken as an example only and not to limit the scope of the disclosure.

Users 46, 48, 50, 52 may access computing device 12 and tuple of interest identification process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Tuple of interest identification process 10 may include one or more user interfaces, such as browsers and textual or graphical user interfaces, through which users 46, 48, 50, 52 may access tuple of interest identification process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some embodiments, computing device 12 may include a compiler 64 for compiling streaming application 20 and/or deploying a plurality of stream operators on a plurality of computing devices.

As discussed above and referring also at least to FIGS. 2-5, tuple of interest identification process 10 may identify 200 at least one tuple of interest from a plurality of tuples during execution of a streaming application. A window of tuples including the at least one tuple from the plurality of tuples may be defined 202. One or more operations may be performed 204 on the window of tuples.

In some implementations consistent with the present disclosure, systems and methods may be provided for identifying tuples of interest and performing one or more operations on a window of tuples including the tuple of interest. Stream computing is a component of the Big Data paradigm where high volumes of data, both structured and unstructured, are processed in near real time. Generally, data enters a streaming application as tuples from some source (e.g., tcp, udp, Apache KAFKA®, MQSeries®, even files) and stream operators process the tuples as they arrive. Stream operators may do various functions, such as filter operations, aggregate operations, splitting operations, etc. The problem is that out of the box, all data is treated the same. It is up to the developer to create carefully crafted operators to process data. However, it may be observed over time that there are patterns in tuples that have a tendency to be of more interest than other tuples. Sometime these "tuples of interest" may wreak havoc on a streaming application because they process too slow or even too fast. These anomalies may make debugging a streaming application problematic. Furthermore, there are times when a streaming application developer and/or a streaming application user would like to observe groups or windows of these tuples of interest.

As generally discussed above with reference to FIGS. 2 and 3, tuple of interest identification process 10 may identify 200 at least one tuple of interest from a plurality of tuples during execution of a streaming application. In a stream application or a stream computing application (e.g., streaming application 300), a plurality of logical operations or stream operators (e.g., stream operators Operator A 302, Operator B 304, Operator C 306, Operator D 308) may be connected to one another such that a data load flows from one stream operator to the next (e.g., over a TCP/IP socket). When a stream operator (e.g., Operator B 304) receives data, it may perform logical operations which may change the data load by adding attributes, subtracting attributes, and/or updating the values of existing attributes within the data load. When the logical operation of the stream operator is complete, the data load may be output and sent to the next stream operator. In some implementations, a source stream operator may generally include a stream operator that may input a data load into a streaming application and a sink stream operator may generally include a stream operator that may output the data load from the streaming application. As will be discussed in greater detail below, the source stream operators and/or sink stream operators may include one or more external connections outside of the streaming application.

In some embodiments, stream operators in a streaming application may be placed in a processing element (e.g., Processing Element A 310) that may be executable by a computing device. In this way, a processing element may be an execution container for stream operators. In some implementations, stream operators may be fused together within a processing element (e.g., a processing element with a plurality of fused stream operators). In some embodiments, processing elements may share a common process space, resulting in much faster communication between stream operators than is available using inter-process communication techniques. In some embodiments, one or more processing elements capable of processing a data load may be deployed or executed on a computing device. For example, a computing device (e.g., System A 312) may execute one or more processing elements. Each processing element may be capable and/or configured to process a received data load based upon, at least in part, one or more stream operators placed in the processing element. In some embodiments, a computing device, such as computing device 12, may include and/or execute any number of processing elements capable of and/or configured to process the received data load.

In some embodiments, a data load, in the context of stream computing, may flow from one stream operator and/or processing element to another in the form of a tuple. In some embodiments, a tuple may be a sequence of one or more attributes associated with an entity. Attributes may be any of a variety of different types, (e.g., integer, float, Boolean, string, etc.) In some embodiments, the attributes may be ordered. In addition to attributes associated with an entity, a tuple may include metadata, (i.e., data about the tuple). A tuple may be extended by adding one or more additional attributes or metadata to it. A stream or a data stream may generally refer to a sequence of tuples. In some embodiments, a stream may be considered a pseudo-infinite sequence of tuples.

As discussed above and in some embodiments, an output tuple may be changed (e.g., relative to an input tuple) in some way by a stream operator. An attribute or metadata may be added, deleted, or modified. For example, a tuple may have one or more attributes. A stream operator may receive the tuple having multiple attributes and output a tuple corresponding with the input tuple. In one example, the stream operator may change one of the attributes so that all of the attributes of the output tuple except e.g., one are the same as the attributes of the input tuple. However, any number of changes may be made to the input tuple such that the output tuple includes the changes made to the input tuple.

In some implementations, tuple of interest identification process 10 may receive a streaming application which may specify one or more stream operators through which a data load may be processed to obtain a desired output data load. Tuple of interest identification process 10 may compile the streaming application (e.g., via compiler 64) to deploy the one or more stream operators specified by the streaming application in one or more processing elements on one or more computing devices. In this way, tuple of interest identification process 10 may determine whether or not to fuse various stream operators into the same processing element, which stream operators to deploy on various computing devices, how the stream operators may be deployed over time (e.g., in response to changes in demand by the streaming application), etc. In some implementations, tuple of interest identification process 10 may control and/or configure the internal connections of the plurality of stream operators while streaming the data load (e.g., during runtime). It will also be appreciated that tuple of interest identification process 10 may control and/or configure the internal connections of the plurality of stream operators during testing and development of streaming application.

Figure 3:
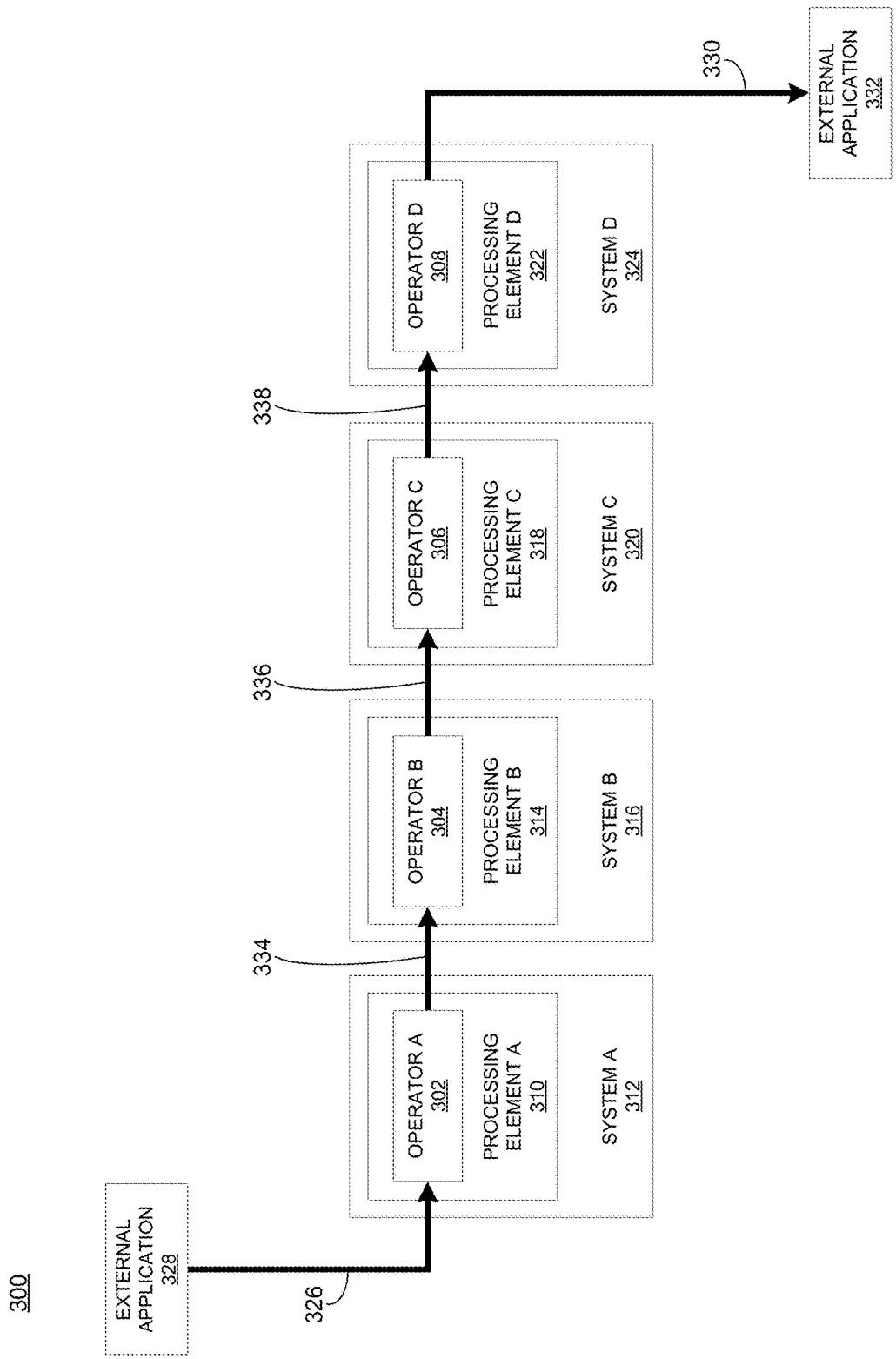
FIG. 3 is an example diagrammatic view of a streaming application according to one or more example implementations of the disclosure.

In some embodiments, a streams graph may generally describe a connected graph of stream operators through which the data load or tuple may progress for a given streaming application. Referring also to FIG. 3, and as will be described in greater detail below, a streams graph 300 may include a plurality of stream operators, 302, 304, 306, 308. In the example of FIG. 3, the plurality of stream operators 302, 304, 306, 308 may also be referred to Operator A 302, Operator B 304, Operator C 306, and Operator D 308, respectively. In some embodiments, and as discussed above, the plurality of stream operators may be placed in a processing element and/or may be deployed on a computing device. For example, Operator A 302 may be placed in Processing Element A 310 and may be deployed on System A 312, Operator B 304 may be placed in Processing Element B 314 and may be deployed on System B 316, Operator C 306 may be placed in Processing Element C 318 and may be deployed on System C 320, and Operator D 308 may be placed in Processing Element D 322 and may be deployed on System D 324. As discussed above, the plurality of stream operators may be placed in a plurality of processing elements to execute the plurality of stream operators by the plurality of computing devices.

In some implementations, one or more stream operators (e.g., Operator A 302) may be configured as a source stream operator with one or more external connections (e.g., external connection 326) to one or more non-streaming applications (e.g., external application 328) and one or more stream operators (e.g., Operator D 308) may be configured as a sink stream operator with one or more external connections (e.g., external connection 330) to one or more non-streaming applications (e.g., external application 332). In some implementations, one or more operators may include one or more internal connections (e.g., internal connections 334, 336, 338).

Figure 4:
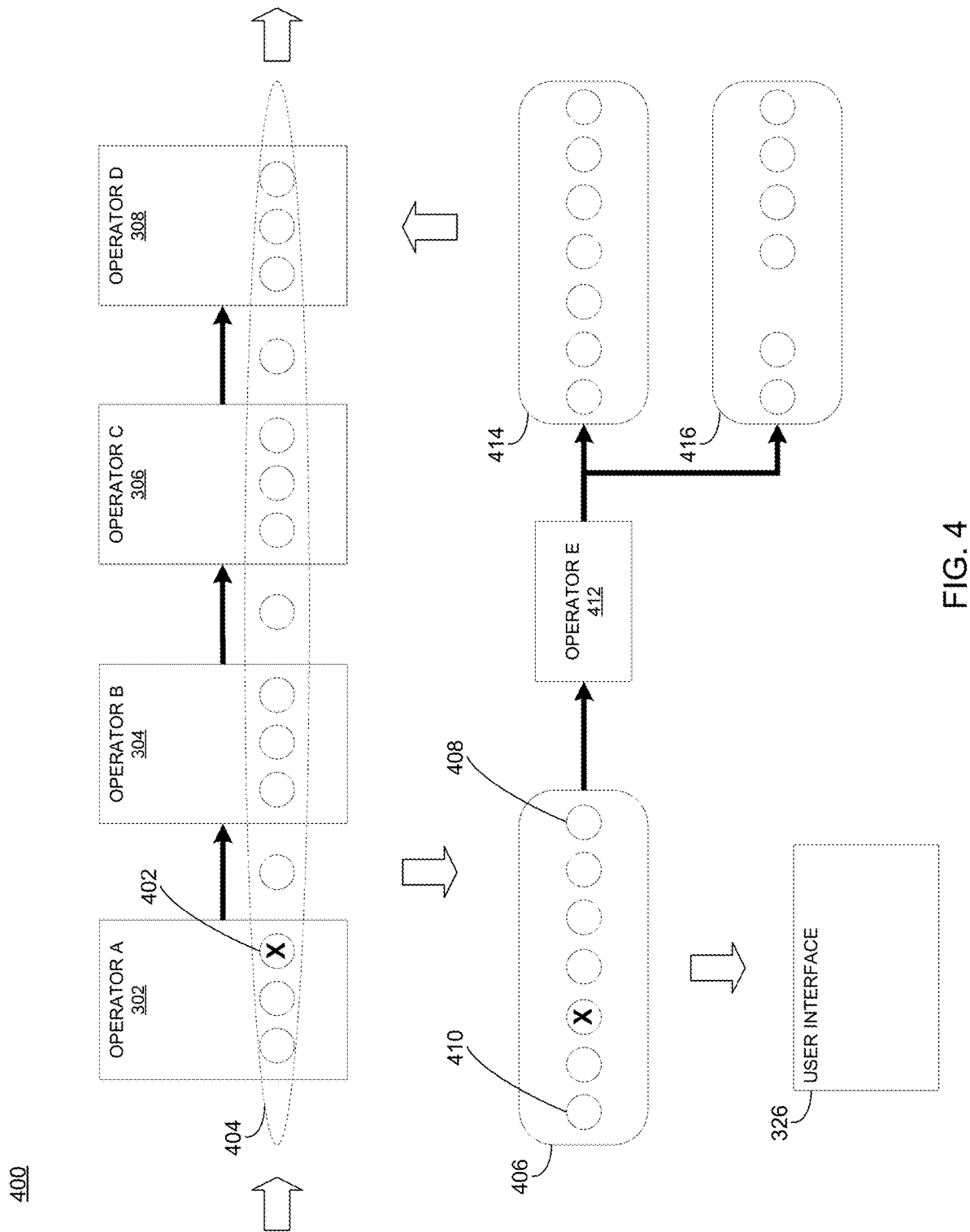
FIG. 4 is an example diagrammatic view of a streaming application according to one or more example implementations of the disclosure.

Referring also to FIG. 4 and in some implementations, tuple of interest identification process 10 may identify 200 at least one tuple of interest from a plurality of tuples during execution of a streaming application. A tuple of interest (e.g., tuple of interest 402) may generally include an anomalous tuple or data load. For example, a streaming application (e.g., stream application 400) may receive a data load including a plurality of tuples (e.g., stream of tuples 404). In some implementations, the tuples may include one or more attributes. As discussed above, a plurality of stream operators may perform one or more logical operations on the plurality of tuples (e.g., stream of tuples) which may modify the one or more attributes of a respective tuple. In some implementations, a tuple of interest (e.g., tuple of interest 402) may include an anomalous tuple relative to the plurality of tuples. For example, suppose a plurality of tuples include a personnel profile with attributes including e.g., name, age, social security number, weight, etc. In some implementations, suppose that the weight value in a personnel profile of a given tuple is "10,000 lbs." Relative to the plurality of tuples, the weight value of this example tuple may be anomalous relative to the other weight value of other tuples of the plurality of tuples and may indicate that this tuple has bad data or may have been corrupted. As such, and in general, in an example embodiment, a tuple may be considered anomalous relative to other tuples if an attribute value is outside of a threshold range of closeness to the corresponding attribute value of other tuples in the data stream. While values associated with attributes have been discussed, it will be appreciated that a tuple may be identified as anomalous based on other criteria or data types.

In some implementations, identifying 200 the at least one tuple of interest may include identifying 206 the at least one tuple of interest based upon, at least in part, one or more of a relative processing time associated with each of the plurality of tuples, a relative value associated with each of the plurality of tuples, and a stream operator state associated with processing each of the plurality of tuples. In some implementations, a processing time associated with a tuple may generally include the amount of time required (e.g., per operator, per processing element, and/or per streaming application) to be processed. For example, a tuple may enter Operator A 302 of Processing Element 310 on System 312. Operator A 302 may include one or more logical operations to perform on the plurality of tuples (e.g., stream of tuples 404). When Operator A 302 is finished processing each tuple, the tuple may flow from Operator A 302 to the next downstream stream operator (e.g., Operator B 304). The time required by each tuple of a plurality of tuples (e.g., stream of tuples 404) may be recorded by tuple of interest identification process 10. In some implementations, tuple of interest identification process 10 may generate statistical data associated with the processing time of each tuple through each stream operator (e.g., an average amount of processing time required to process a given tuple).

In some implementations, a tuple of interest may be identified 206 when a tuple takes too long to process (e.g., relative to the plurality of tuples processed by a stream operator and/or processing element). In some implementations, tuple of interest identification process 10 may identify 206 a tuple of interest (e.g., tuple of interest 402) based upon, at least in part, a maximum processing time threshold. In some implementations, the maximum processing time threshold may be user-defined and/or may be a default maximum processing time threshold determined by tuple of interest identification process 10 (e.g., based upon, at least in part, statistical data generated by tuple of interest identification process 10). In this way, the maximum processing time threshold may be dynamic for a given operator and/or processing element and may adapt to any changes in the processing time for the given operator and/or processing element over time.

In some implementations, a tuple of interest may be identified 206 when a tuple is processed too quickly (e.g., relative to the plurality of tuples processed by a stream operator and/or processing element). In some implementations, tuple of interest identification process 10 may identify 206 a tuple of interest (e.g., tuple of interest 402) based upon, at least in part, a minimum processing time threshold. In some implementations, the minimum processing time threshold may be user-defined and/or may be a default minimum processing time threshold determined by tuple of interest identification process 10 (e.g., based upon, at least in part, statistical data generated by tuple of interest identification process 10). In this way, the minimum processing time threshold may be dynamic for a given operator and/or processing element and may adapt to any changes in the processing time for the given operator and/or processing element over time.

In some implementations, tuple of interest identification process 10 may identify 206 the at least one tuple of interest based upon, at least in part, a relative value associated with each of the plurality of tuples. As discussed above, a tuple may include one or more attributes with one or more values. In some implementations, when a tuple enters Operator A 302 of Processing Element 310 on System 312, Operator A 302 may include one or more logical operations to perform on the tuple that may or may not modify the one or more values of the one or more attributes. In this way, the one or more stream operators of a stream application may be configured for modifying different attributes with various values. In some implementations, the one or more stream operators configured to receive the plurality of tuples may be configured to expect various attribute values. For example and as discussed above, a weight attribute associated with a personnel profile may have an expected range of values. In some implementations, tuple of interest identification process 10 may determine an expected range of values for a given attribute of a plurality of tuples by generating statistical data associated with the value of each tuple (e.g., an average value).

In some implementations, a tuple of interest may be identified 206 when a tuple includes a value for a given attribute that is too high. In some implementations, tuple of interest identification process 10 may identify 206 a tuple of interest (e.g., tuple of interest 402) based upon, at least in part, a maximum attribute value threshold. In some implementations, the maximum attribute value threshold may be user-defined and/or may be a default maximum attribute value threshold determined by tuple of interest identification process 10 (e.g., based upon, at least in part, statistical data generated by tuple of interest identification process 10). In this way, the maximum attribute value threshold may be dynamic for a given attribute and may adapt to any changes in the values for the given attribute over time.

Similarly, a tuple of interest may be identified 206 when a tuple includes a value for a given attribute that is too low. In some implementations, tuple of interest identification process 10 may identify 206 a tuple of interest (e.g., tuple of interest 402) based upon, at least in part, a minimum attribute value threshold. In some implementations, the minimum attribute value threshold may be user-defined and/or may be a default attribute value threshold determined by tuple of interest identification process 10 (e.g., based upon, at least in part, statistical data generated by tuple of interest identification process 10). In this way, the minimum attribute value threshold may be dynamic for a given attribute and may adapt to any changes in the values for the given attribute over time.

In some implementations, a tuple of interest may be identified 206 when a tuple includes values for a given attribute that are more than an attribute value standard deviation threshold out (e.g., 3 sigma out from a Gaussian distribution of the values). As discussed above, tuple of interest identification process 10 may generate statistical data during the execution of a streaming application to determine expected or average values for a given attribute of the plurality of tuples. In some implementations, tuple of interest identification process 10 may generate a probability distribution function for the values of a given attribute of the plurality of tuples. In this way, tuple of interest identification process 10 may determine when values associated with a tuple are anomalous (e.g., based upon an attribute value standard deviation threshold). In some implementations, the attribute value standard deviation threshold may be user-defined and/or may be a default attribute value standard deviation threshold determined by tuple of interest identification process 10 (e.g., based upon, at least in part, statistical data generated by tuple of interest identification process 10).

In some implementations, a tuple of interest may be identified 206 when a tuple includes a set of values that have not occurred together before and/or occur together relatively infrequently (e.g., based upon, at least in part, statistical data generated by tuple of interest identification process 10). For example and as discussed above, tuple of interest identification process 10 may generate statistical data associated with the processing of a plurality of tuples through a streaming application. In some implementations, tuple of interest identification process 10 may identify expected values of a given attribute relative to values of another attribute in the same tuple. For example and in some implementations where a tuple includes e.g., a vehicle registration entry with at least a curb weight attribute and vehicle class attribute (e.g., a type of vehicle), a tuple may include a curb weight attribute value of "ten tons (e.g., 20,000 lbs.)" with vehicle class attribute value of "convertible". In some implementations, the curb weight attribute value and/or the vehicle class attribute value taken alone may not be considered an anomaly or outside of any individual attribute value thresholds. However, when tuple of interest identification process 10 receives a tuple with a combination of values that have not occurred together previously and/or relatively infrequently occur together (e.g., based on the statistical data), tuple of interest identification process 10 may identify 206 such a tuple as a tuple of interest (e.g., tuple of interest 402).

In some implementations, tuple of interest identification process 10 may identify 206 the at least one tuple of interest based upon, at least in part, a stream operator state associated with processing each of the plurality of tuples. A stream operator state may generally include the state or condition of a stream operator. For example, when a stream operator is performing properly (e.g. in response to processing expected types and values of tuples), the stream operator may be in a "normal" stream operator state. In some implementations, when a stream operator is not performing properly (e.g., in response to processing unexpected types and/or values of tuples), the stream operator may be in a "failed" state. In some implementations, in response to a stream operator entering a failed state, tuple of interest identification process 10 may write or dump any errors to a log and may terminate the streaming application. In some implementations, a tuple may cause special processing (e.g., such as a stream operator failure). In some implementations, tuple of interest identification process 10 may identify 200 the tuple that caused a failure (e.g., tuple that was processed/being processed when the stream operator entered the "failed" state) as a tuple of interest (e.g., tuple of interest 402).

In some implementations, tuple of interest identification process 10 may identify 206 the at least one tuple of interest based upon changes in the normal operation of a computing device or host system. For example, suppose tuple of interest identification process 10 is processing a plurality of tuples. While processing a specific tuple (e.g., tuple of interest 402), suppose the amount of CPU processing by the host system begins to increase. In some implementations, tuple of interest identification process 10 may identify the at least one tuple that causes e.g., the amount of CPU processing to increase, to be identified as a tuple of interest (e.g., tuple of interest 402). While an increase in CPU processing has been described, it will be appreciated that other changes in the operation of the host computing device are possible and within the scope of the present disclosure.

In some implementations, tuple of interest identification process 10 may receive one or more conditions that define when a tuple may be identified as a tuple of interest. For example, tuple of interest identification process 10 may receive one or more conditions from user-interface that define when a tuple should be identified as a tuple of interest. In some implementations, tuple of interest identification process 10 may identify 200 a tuple of interest automatically, as a parameter at submission time of a streaming application, (e.g., by adding a flag or other marker for "—interest=processingtime", or "—interest=valueanomaly", or "—interest=failure"), and/or in response to a fault situation where the tuple causes portions of the stream graph to go into failed state. In some implementations, a tuple of interest may be defined within programming logic. For example, a programmer may recognize certain run time conditions as indicative of a tuple of interest and may indicate (e.g., via a user interface of tuple of interest identification process 10) that when such a run time condition is satisfied, tuple of interest identification process 10 may mark the associated tuple as a tuple of interest. In some implementations, one or more conditions may be injected into a running stream application without requiring a recompile and/or resubmission of the stream application.

In some implementations, identifying 200 at least one tuple of interest may include flagging the tuple of interest. For example and in response to identifying 200 tuple of interest (e.g., tuple of interest 402) from the plurality of tuples (e.g., plurality of tuples 404), tuple of interest identification process 10 may flag the tuple of interest with a marker or other indicator. In some implementations, flagging the tuple of interest may include adding a tuple of interest flag attribute to the tuple and updating a tuple of interest flag value for the tuple of interest flag attribute to indicate that the tuple is a tuple of interest. In some implementations, tuple of interest identification process 10 may generate a separate data store and/or database to record which tuples of the plurality of tuples are tuples of interest.

Referring also to FIG. 4 and in some implementations, tuple of interest identification process 10 may define 202 a window of tuples including the at least one tuple of interest from the plurality of tuples. A window of tuples (e.g., window of tuples 406) may generally include a collection or grouping of one or more tuples. In some implementations, a window may provide a group of tuples about or adjacent to a tuple of interest that may e.g., explain how a tuple of interest deviated from adjacent tuples, indicate how a sequence or combination of tuples of interest affects the streaming application and/or may provide a basis for filtering the tuple of interest from the adjacent tuples. In some implementations and as will be discussed in greater detail below, one or more operations may be performed on the window of tuples during run time (e.g., execution of the stream application) without stopping or interrupting the streaming application. In some implementations and in response to identifying 200 the tuple of interest (e.g., tuple of interest 402), tuple of interest identification process 10 may define the window of tuples (e.g., window of tuples 406) by diverting at least the tuple of interest (e.g., tuple of interest 402) to a window of tuples (e.g., window of tuples 406). In some implementations, tuple of interest identification process 10 may copy at least the tuple of interest (e.g., tuple of interest 402) to the window of tuples (e.g., window 406). In some implementations, the at least one tuple may be positioned anywhere in the window of tuples. For example, the tuple of interest (e.g., tuple of interest 402) may be placed in the middle of the window of tuples, at or near the beginning of the window of tuples, at or near the end of the window of tuples, etc.

In some implementations, defining 202 the window of tuples including the at least one tuple of interest may include identifying 208 one or more tuples spatially adjacent to the at least one tuple of interest based upon, at least in part, a spatial adjacency threshold and defining 210 the window of tuples to include the identified one or more tuples spatially adjacent to the at least one tuple of interest. Spatially adjacent may generally refer to a proximity between tuples in space (e.g., within the data stream through the streaming application and/or processing element of the streaming application) before and/or after a tuple of interest based upon, at least in part, a spatial adjacency threshold. For example, tuple of interest identification process 10 may identify 208 a first set of tuples before (e.g., downstream) from the tuple of interest based upon at least in part, a first spatial adjacency threshold (e.g., an downstream spatial adjacency threshold). In the example of FIG. 4, the spatial adjacency threshold may be e.g., two tuples. Consistent with such an example, tuple of interest identification process 10 may identify 208 the two tuples preceding the tuple of interest in the data stream for inclusion in the window.

In some implementations, tuple of interest identification process 10 may identify 208 a second set of tuples after (e.g., upstream) from the tuple of interest as spatially adjacent to the tuple of interest (e.g., tuple of interest 402) based upon at least in part, a second spatial adjacency threshold (e.g., an upstream spatial adjacency threshold). In the example of FIG. 4, the second spatial adjacency threshold may be e.g., four tuples. Consistent with such an example, tuple of interest identification process 10 may identify 208 the four tuples following the tuple of interest in the data stream for inclusion in the window. In some implementations, the upstream spatial adjacency threshold may be different from the downstream spatial adjacency threshold. In some implementations, the upstream spatial adjacency threshold may be the same as the downstream spatial adjacency threshold. In some implementations, the spatial adjacency threshold (e.g., the upstream spatial adjacency threshold and/or the downstream spatial adjacency threshold) may be user-defined and/or may be a default spatial adjacency threshold determined by tuple of interest identification process 10. In some implementations and in response to identifying 208 the one or more tuples spatially adjacent to the at least one tuple of interest, tuple of interest identification process 10 may define 210 the tuple of interest to include the one or more tuples spatially adjacent to the at least one tuple of interest.

In some implementations, defining 202 the window of tuples including the at least one tuple of interest may include identifying 212 one or more tuples temporally adjacent to the at least one tuple of interest based upon, at least in part, a temporal adjacency threshold and defining 214 the window of tuples to include the identified one or more tuples temporally adjacent to the at least one tuple of interest. Temporally adjacent may generally refer to a proximity between tuples in time before and/or after a tuple of interest based upon, at least in part, a temporal adjacency threshold. In some implementations, tuple of interest identification process 10 may identify 212 a first set of tuples flowing in the stream of tuples relative to a specific point for a first period of time before (e.g., downstream) the tuple of interest based upon at least in part, a first temporal adjacency threshold (e.g., a downstream temporal adjacency threshold). For example, tuple of interest 402 may be identified 200 when tuple of interest 402 flows into Operator A 302. In some implementations, tuple of interest identification process 10 may identify 212 one or more tuples that flowed into Operator A 302 before tuple of interest 402 flowed into Operator A 302 based upon, at least in part, a first temporal adjacency threshold (e.g., a downstream temporal adjacency threshold).

In some implementations, tuple of interest identification process 10 may identify 210 a second set of tuples flowing in the stream of tuples relative to a specific point for a second period of time after (e.g., upstream) the tuple of interest based upon at least in part, a second temporal adjacency threshold (e.g., an upstream temporal adjacency threshold). In some implementations, tuple of interest identification process 10 may identify 210 one or more tuples that flowed into Operator A 302 after tuple of interest 402 flowed into Operator A 302 based upon, at least in part, a second temporal adjacency threshold (e.g., an upstream temporal adjacency threshold). In some implementations, the temporal adjacency threshold (e.g., the upstream temporal adjacency threshold and/or the downstream temporal adjacency threshold) may be user-defined and/or may be a default temporal adjacency threshold determined by tuple of interest identification process 10. In some implementations and in response to identifying 212 the one or more tuples temporally adjacent to the at least one tuple of interest, tuple of interest identification process 10 may define 214 the tuple of interest to include the one or more tuples temporally adjacent to the at least one tuple of interest.

In some implementations, there may be periods of time where one or more tuples of interest may be identified 200. For example, during a e.g., thirty minute period during the day, a streaming application may be expected to receive a plurality of tuples of interest (e.g., due to recurring issues on a front end system, expected data corruption, etc.). Tuple of interest identification process 10 may receive and/or may automatically define (e.g., based upon, at least in part, the statistical data) a temporal adjacency threshold of e.g., thirty minutes based upon the expectation of identifying 200 a plurality of tuples of interest during the thirty minute period.

In some implementations, the window of tuples surrounding the tuple of interest may be defined using a history of tuples that flowed into and/or out of a given stream operator. For example, tuple of interest identification process 10 may reference a history of the plurality of tuples that flowed into and/or out of Operator A 302 to define the window of tuples about tuple of interest 402. In some implementations, tuple of interest identification process 10 may determine that a first set of tuples (e.g., two tuples) flowed into Operator A 302 after tuple of interest 402 based upon, at least in part, a spatial adjacency threshold (e.g., an upstream spatial adjacency threshold). In some implementations, tuple of interest identification process 10 may determine that a second set of tuples (e.g., four tuples) flowed into Operator A 302 before tuple of interest 402 based upon, at least in part, a spatial adjacency threshold (e.g., an downstream spatial adjacency threshold). Consistent with such an example, the window may include seven tuples, i.e., the two tuples that flowed into Operator A 302 after tuple of interest, tuple of interest 402 itself, and the four tuples that flowed into Operator A 302 before tuple of interest 402.

In some implementations, defining 202 the window of tuples may include flagging the tuples defined in the window of tuples. For example and in response to defining the window of tuples (e.g., window of tuples 406), tuple of interest identification process 10 may flag the tuples defined in the window of tuples with a flag or other marker. In some implementations, flagging the tuples defined in the window of tuples may include adding a window flag attribute to tuples and updating a window flag value for the window flag attribute to indicate that the tuple is a tuple of interest. In some implementations, tuple of interest identification process 10 may generate a separate data store and/or database to record which tuples of the plurality of tuples are defined in the window of tuples. In some implementations, tuple of interest identification process 10 may flag a first tuple in the window of tuples and a last tuple in the window of tuples to define the bounds of the window of tuples.

In some implementations, tuple of interest identification process 10 may require more than one interesting tuple to define a window of tuples. For example and as will be discussed in greater detail below, tuple of interest identification process 10 may include a threshold number of tuples of interest that may be identified 200 before defining 202 a window of tuples. In some implementations, tuple of interest identification process 10 may receive one or more window conditions that may indicate what occurs when multiple tuples are marked as interesting, such as how many windows, which tuples go into which window, etc. For example, tuple of interest identification process 10 may receive one or more window conditions that indicate that tuple of interest identification process 10 needs to identify 200 a minimum number of tuples of interest (e.g., at least ten tuples of interest) before defining 202 a window of tuples including the tuples of interest. In some implementations, tuple of interest identification process 10 may receive one or more window conditions that indicate that tuple of interest identification process 10 needs to identify 200 a minimum number of tuples of interest within a defined period of time (e.g., at least ten seconds) before defining 202 a window of tuples including the tuple of interest. In some implementations, the minimum number of tuples of interest and/or the defined period of time for identifying 200 the minimum number of tuples of interest may be user-defined and/or may be determined by tuple of interest identification process 10.

In some implementations, tuple of interest identification process 10 may perform 204 one or more operations on the window of tuples. As discussed above and in some implementations, tuple of interest identification process 10 may define a window of tuples including the tuple of interest and perform one or more operations on the window of tuples without disrupting the streaming application. In some implementations, tuple of interest identification process 10 may enable a user to diagnose and/or resolve potential problems with a streaming application by identifying and isolating tuples of interest while the remainder of the streaming application continues to be executed.

In some implementations, performing 204 the one or more operations on the window of tuples may include communicating 216 the window of tuples as a batch to one or more stream operators in the streaming application. In some implementations, tuple of interest identification process 10 may communicate the window of tuples as a batch for processing the window of tuples together. In some implementations, one or more stream operators may be configured by tuple of interest identification process 10 to act upon the window of tuples together and/or tuple of interest identification process 10 may use the window start and window end tuples as demarcation events. For example, a window of tuples may include a first tuple of a window (e.g., tuple 408) and a last tuple of a window (e.g., tuple 410). In some implementations and in response to identifying the first tuple of a window (e.g., tuple 408), tuple of interest identification process 10 may begin communicating 216 the plurality of tuples to a specific stream operator (e.g., Operator E 412). In some implementations, tuple of interest identification process 10 may identify the last tuple of a window (e.g., tuple 408) and may cease communicating the plurality of tuples to Operator E 412. In some implementations, the subsequent tuples (e.g., the plurality of tuples received after tuple 410) may be processed as normal in the streaming application (e.g., by the next downstream stream operator). In some implementations, tuple of interest identification process 10 may communicate 216 the window of tuples down a different part of the operator graph than the other tuples (e.g., tuples not defined within the window of tuples). As discussed above, by communication or diverting the window of tuples including at least one tuple of interest, tuple of interest identification process 10 may perform 204 one or more operations on the window of tuples without terminating the streaming application.

In some implementations, tuple of interest identification process 10 may communicate 216 the windows of tuples to a specific stream operator based upon, at least in part, the tuple of interest. For example and as will be discussed in greater detail below, suppose Operator E 412 is configured (e.g., by tuple of interest identification process 10) to perform one or more modifications to at least one tuple of the window of tuples. In some implementations, tuple of interest identification process 10 may communicate 216 the window of tuples (e.g., window 406) to Operator E 412 when tuple of interest identification process 10 determines that the window of tuples (e.g., window 406) includes a specific tuple of interest (e.g., a tuple of interest based upon, at least in part, processing time, attribute values, and/or a resulting stream operator condition or state associated with the tuple of interest).

In some implementations, performing 204 the one or more operations on the window of tuples may include modifying 218 at least a portion of the tuples defined in the window of tuples based upon, at least in part, the at least one tuple of interest. In some implementations, modifying 218 at least a portion of the tuples defined in the window of tuples may include performing one or more corrective actions on the tuples. For example, tuple of interest identification process 10 may modify 218 at least a portion of the tuples defined in the window of tuples by cleansing data within the window of tuples. Referring also to FIG. 4 and in some implementations, tuple of interest identification process 10 may modify the tuples in the window of tuples (e.g., window of tuples 406) by modifying 218 the tuple of interest (e.g., tuple of interest 402) to produce a modified window of tuples (e.g., window of tuples 414). For example, suppose the tuple of interest (e.g., tuple of interest 402) includes an anomalous value for a specific attribute (e.g., anomalous relative to other values for the given attribute in the tuples of the window of tuples). Tuple of interest identification process 10 may modify the data by correcting the anomalous value. For example, tuple of interest identification process 10 may determine that each value in the tuple of interest includes an extra zero which may cause one or more of the values to appear anomalous. In this example, tuple of interest identification process 10 may remove the extra zero to modify the tuple of interest. In some implementations, tuple of interest identification process 10 may return the tuples defined in the modified window of tuples (e.g., window of tuples 414) to the streaming application. In some implementations, performing the one or more operations may include performing summarization and/or aggregation operations on the window of tuples.

In some implementations, modifying 218 at least a portion of the tuples defined in the window of tuples may include removing at least the portion of the tuples from the streaming application. For example, a programmer and/or tuple of interest identification process 10 may determine that the tuple of interest and/or one or more of the group of tuples defined in the window of tuples is disinteresting (i.e., untrustworthy, unverifiable, corrupted, etc.) and may be removed from the streaming application. In some implementations, tuple of interest identification process 10 may determine whether or not at least a portion of the tuples defined in the window of tuples is disinteresting based upon, at least in part, a comparison of the processing time, the attribute values, and/or the resulting operator state associated with the tuples defined in the window of tuples with an expected or average processing time, expected or average attribute values, and/or an expected resulting operator state associated with the plurality of tuples. For example, suppose that a portion of the tuples defined in the window of tuples requires e.g., five times as long to process through an operator (e.g., Operator A 302). In some implementations, tuple of interest identification process 10 may determine that these tuples may not be otherwise cleansed or modified to resolve the anomalous processing time. Tuple of interest identification process 10 may determine that the portion of tuples defined in the window of tuples is disinteresting and should be removed from the streaming application.

In some implementations and in response to determining that at least a portion of the tuples defined in the window of tuples (e.g., window of tuples 406) is disinteresting, tuple of interest identification process 10 may remove the portion of tuples from the streaming application. For example, suppose tuple of interest identification process 10 determines that the tuple of interest (e.g., tuple of interest 402) is disinteresting, tuple of interest identification process 10 may remove the tuple of interest (e.g., tuple of interest 402) from the window of tuples (e.g., window of tuples 406) to produce a modified window of tuples (e.g., window of tuples 416). In some implementations, tuple of interest identification process 10 may determine that the tuple of interest (e.g., tuple of interest 402) is disinteresting and may remove the tuple of interest from the window of tuples to produce a modified window of tuples (e.g., window of tuples 416). In some implementations, tuple of interest identification process 10 may return the tuples defined in the modified window of tuples (e.g., window of tuples 416) to the streaming application. As discussed above and in some implementations, tuple of interest identification process 10 may remove at least a portion of the tuples defined in the window of tuples without terminating the streaming application. In this way, tuple of interest identification process 10 may allow streaming application to continue to execute even when tuples of interest are identified that may potentially cause errors or failure states on one or more stream operators. By removing such tuples of interest from the streaming application, tuple of interest identification process 10 may allow other tuples to be processed and may provide a debugging environment to analyze the tuple of interest for future execution of the streaming application.

In some implementations, modifying 218 at least a portion of the tuples defined in the window of tuples may include filtering the at least a portion of the tuples from the window of tuples. For example and in some implementations, the one or more tuples that define a window (e.g., window of tuples 406) may filter out (e.g., via tuple of interest identification process 10) at least a portions of the tuples from the window of tuples. In some implementations, filtering out at least a portion of the tuples from the window of tuples may include receiving one or more filtering conditions from a stream computing management application (e.g., IBM Streams) and/or from a programmer (e.g., via user interface 418). For example, the one or more filtering conditions may filter out tuples outside of a specified time range of the tuple of interest and/or that do not contain a value matching the tuple of interest (e.g., keeping tuples in the window of tuples that are received within a time range and that contain a value matching the tuple of interest). It will be appreciated that various filtering conditions may be received and used by tuple of interest identification process 10 to filter at least a portion of the tuples from the window of tuples.

In some implementations, performing 204 the one or more operations on the window of tuples may include adjusting 220 the streaming application based upon, at least in part, the identified tuple of interest. In some implementations, tuple of interest identification process 10 may adjust 220 the streaming application to account for anomalies based upon, at least in part, the tuple of interest. For example, tuple of interest identification process 10 may include adjusting acceptable values for one or more attributes processed by one or more stream operators of the streaming application. In some implementations, tuple of interest identification process 10 may adjust 220 the streaming application by revising the deployment of the one or more stream operators on the one or more host computing devices. For example, suppose that the tuple of interest requires e.g., five times as long to process in Operator A 302 than other tuples of the plurality of tuples. In some implementations, tuple of interest identification process 10 may adjust 220 the streaming application by e.g., redeploying Operator A 302 to a different host computing device with more processing power. In some implementations, tuple of interest identification process 10 may adjust the streaming application by adding or removing one or more host computing devices. For example, tuple of interest identification process 10 may determine that one or more computing devices (e.g., System A 312) may not be able to handle the tuple of interest and may substitute another computing device for System A 312 and/or may add additional host computing devices to support the streaming application. In some implementations, tuple of interest identification process 10 may adjust 220 the streaming application by fusing one or more stream operators into a common processing element. In some implementations, tuple of interest identification process 10 may determine that fusing one or more stream operators within a common processing element may help alleviate a burden on a particular stream operator when the tuple of interest is received. It will be appreciated that other adjustments may be made to the streaming application.

In some implementations, performing 204 the one or more operations on the window of tuples may include viewing the window of tuples at a user interface. For example and in some implementations, the window of tuples may be used to use as a view into the stream. A view may generally include a functionality that allows a user or programmer to peek into what tuples are being passed through a streaming application. In some implementations, the window of tuples may provide a view of tuples independent of a stream operator. For example and in some conventional streaming applications, a view may be applied to an input or output of a stream operator to see the tuples as they enter and/or exit. In some implementations, the window of tuples may provide a view of the tuples themselves independent from any stream operator. In this way, tuple of interest identification process 10 may provide a user (e.g., at user interface 418) with the ability to observe the tuple of interest and/or the window of tuples defined around the tuple of interest to diagnose and/or debug errors and/or issues associated with a tuple of interest in a streaming application. In some implementations, tuple of interest identification process 10 may output the view to user interface 418 (e.g., Microsoft Excel, other plug-in, RESTful API, etc.). In some implementations, tuple of interest identification process 10 may save or output the view of the window of tuples to a file or other persistent storage. In some implementations, providing a view of tuples may include providing a view of an entire data stream and values and/or a sample of the data stream. In some implementations where the view includes a sample of the data stream, tuple of interest identification process 10 may highlight tuples of interest and values of interest from the sample.

Figure 5:
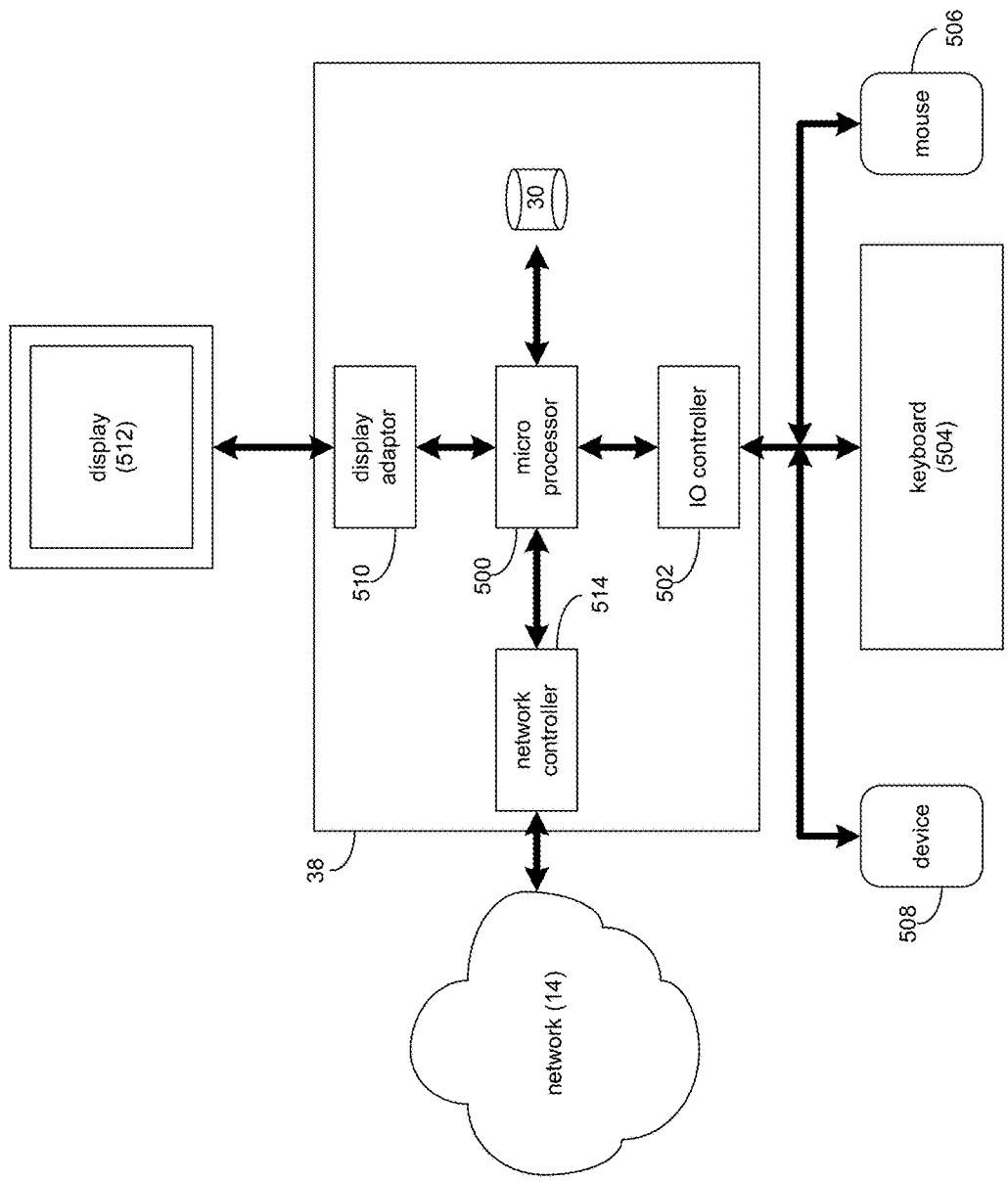
FIG. 5 is an example diagrammatic view of a client electronic device of FIG. 1 according to one or more example implementations of the disclosure.

Referring also to FIG. 5, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, tuple of interest identification process 10 may be substituted for client electronic device 38 within FIG. 5, examples of which may include but are not limited to computing device 12 and/or client electronic devices 40, 42, 44.

Client electronic device 38 may include a processor and/or microprocessor (e.g., microprocessor 500) configured to, e.g., process data and execute the above-noted code/instruction sets and subroutines. Microprocessor 500 may be coupled via a storage adaptor (not shown) to the above-noted storage device(s) (e.g., storage device 30). An I/O controller (e.g., I/O controller 502) may be configured to couple microprocessor 500 with various devices, such as keyboard 504, pointing/selecting device (e.g., mouse 506), custom device, such a microphone (e.g., device 508), USB ports (not shown), and printer ports (not shown). A display adaptor (e.g., display adaptor 510) may be configured to couple display 512 (e.g., CRT or LCD monitor(s)) with microprocessor 500, while network controller/adaptor 514 (e.g., an Ethernet adaptor) may be configured to couple microprocessor 500 to the above-noted network 14 (e.g., the Internet or a local area network).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method for processing tuples of interest in a streaming application environment, comprising:
   identifying, at a computing device, at least one tuple of interest from a plurality of tuples in a data stream during execution of a streaming application, wherein each tuple within the plurality of tuples includes one or more attributes, wherein identifying the at least one tuple of interest includes identifying the at least one tuple of interest based upon, at least in part, an attribute value of the tuple of interest exceeding an attribute value threshold for the attribute value;
   defining a window of tuples including the at least one tuple of interest from the plurality of tuples;
   revising deployment of one or more stream operators on one or more host computing devices based on the identified at least one tuple of interest; and
   performing, using the one or more stream operators, one or more operations on the window of tuples.

2. The computer-implemented method of claim 1, wherein defining the window of tuples including the at least one tuple of interest includes:
   identifying one or more tuples spatially adjacent to the at least one tuple of interest based upon, at least in part, a spatial adjacency threshold; and
   defining the window of tuples to include the identified one or more tuples spatially adjacent to the at least one tuple of interest.

3. The computer-implemented method of claim 1, wherein defining the window of tuples including the at least one tuple of interest includes:
   identifying one or more tuples temporally adjacent to the at least one tuple of interest based upon, at least in part, a temporal adjacency threshold; and
   defining the window of tuples to include the identified one or more tuples temporally adjacent to the at least one tuple of interest.

4. The computer-implemented method of claim 1, wherein performing the one or more operations on the window of tuples includes:
   communicating the window of tuples as a batch to one or more stream operators in the streaming application.

5. The computer-implemented method of claim 1, wherein performing the one or more operations on the window of tuples includes:

modifying at least a portion of the tuples defined in the window of tuples based upon, at least in part, the at least one tuple of interest.

6. The computer-implemented method of claim 1, wherein performing the one or more operations on the window of tuples includes:
adjusting the streaming application based upon, at least in part, the identified tuple of interest.

7. A computer program product for processing tuples of interest in a streaming application environment, comprising a non-transitory computer readable storage medium having a plurality of instructions stored thereon, which, when executed by a processor, cause the processor to perform operations comprising:
identifying, at a computing device, at least one tuple of interest from a plurality of tuples in a data stream during execution of a streaming application, wherein each tuple within the plurality of tuples includes one or more attributes, wherein identifying the at least one tuple of interest includes identifying the at least one tuple of interest based upon, at least in part, an attribute value of the tuple of interest exceeding an attribute value threshold for the attribute value;
defining a window of tuples including the at least one tuple of interest from the plurality of tuples;
revising deployment of one or more stream operators on one or more host computing devices based on the identified at least one tuple of interest; and
performing, using the one or more stream operators, one or more operations on the window of tuples.

8. The computer program product of claim 7, wherein defining the window of tuples including the at least one tuple of interest includes:
identifying one or more tuples spatially adjacent to the at least one tuple of interest based upon, at least in part, a spatial adjacency threshold; and
defining the window of tuples to include the identified one or more tuples spatially adjacent to the at least one tuple of interest.

9. The computer program product of claim 7, wherein defining the window of tuples including the at least one tuple of interest includes:
identifying one or more tuples temporally adjacent to the at least one tuple of interest based upon, at least in part, a temporal adjacency threshold; and
defining the window of tuples to include the identified one or more tuples temporally adjacent to the at least one tuple of interest.

10. The computer program product of claim 7, wherein performing the one or more operations on the window of tuples includes:
communicating the window of tuples as a batch to one or more stream operators in the streaming application.

11. The computer program product of claim 7, wherein performing the one or more operations on the window of tuples includes:

modifying at least a portion of the tuples defined in the window of tuples based upon, at least in part, the at least one tuple of interest.

12. The computer program product of claim 7, wherein performing the one or more operations on the window of tuples includes:
adjusting the streaming application based upon, at least in part, the identified tuple of interest.

13. A computing system for processing tuples of interest in a streaming application environment, including one or more processors and one or more memories configured to perform operations comprising:
identifying, at a computing device, at least one tuple of interest from a plurality of tuples in a data stream during execution of a streaming application, wherein each tuple within the plurality of tuples includes one or more attributes, wherein identifying the at least one tuple of interest includes identifying the at least one tuple of interest based upon, at least in part, an attribute value of the tuple of interest exceeding an attribute value threshold for the attribute value;
defining a window of tuples including the at least one tuple of interest from the plurality of tuples;
revising deployment of one or more stream operators on one or more host computing devices based on the identified at least one tuple of interest; and
performing, using the one or more stream operators, one or more operations on the window of tuples.

14. The computing system of claim 13, wherein defining the window of tuples including the at least one tuple of interest includes:
identifying one or more tuples spatially adjacent to the at least one tuple of interest based upon, at least in part, a spatial adjacency threshold; and
defining the window of tuples to include the identified one or more tuples spatially adjacent to the at least one tuple of interest.

15. The computing system of claim 13, wherein defining the window of tuples including the at least one tuple of interest includes:
identifying one or more tuples temporally adjacent to the at least one tuple of interest based upon, at least in part, a temporal adjacency threshold; and
defining the window of tuples to include the identified one or more tuples temporally adjacent to the at least one tuple of interest.

16. The computing system of claim 13, wherein performing the one or more operations on the window of tuples includes:
communicating the window of tuples as a batch to one or more stream operators in the streaming application.

17. The computing system of claim 13, wherein performing the one or more operations on the window of tuples includes:
modifying at least a portion of the tuples defined in the window of tuples based upon, at least in part, the at least one tuple of interest.

* * * * *